United States Patent
Zeng et al.

(10) Patent No.: US 10,056,999 B2
(45) Date of Patent: Aug. 21, 2018

(54) TIME SYNCHRONIZATION ERROR COMPENSATION METHOD FOR MULTI-HOP WIRELESS BACKHAUL NETWORK BASED ON PTP

(71) Applicant: SHENYANG INSTITUTE OF AUTOMATION, CHINESE ACADEMY OF SCIENCES, Liaoning (CN)

(72) Inventors: Peng Zeng, Liaoning (CN); Zhaowei Wang, Liaoning (CN); Zhibo Li, Liaoning (CN); Dong Li, Liaoning (CN); Jintao Wang, Liaoning (CN)

(73) Assignee: SHENYANG INSTITUTE OF AUTOMATION, CHINESE ACADEMY OF SCIENCES, Shenyang, Liaoning (CN)

( * ) Notice: Subject to any disclaimer, the term of this patent is extended or adjusted under 35 U.S.C. 154(b) by 0 days.

(21) Appl. No.: 15/525,687

(22) PCT Filed: Jan. 14, 2016

(86) PCT No.: PCT/CN2016/070840
§ 371 (c)(1),
(2) Date: May 10, 2017

(87) PCT Pub. No.: WO2017/107261
PCT Pub. Date: Jun. 29, 2017

(65) Prior Publication Data
US 2017/0366287 A1     Dec. 21, 2017

(30) Foreign Application Priority Data
Dec. 24, 2015  (CN) .......................... 2015 1 0988867

(51) Int. Cl.
*H04J 3/06*      (2006.01)
*H04W 92/24*     (2009.01)
*H04L 29/08*     (2006.01)

(52) U.S. Cl.
CPC .......... *H04J 3/0682* (2013.01); *H04J 3/0667* (2013.01); *H04L 29/0863* (2013.01);
(Continued)

(58) Field of Classification Search
CPC ..... H04J 3/0682; H04W 92/24; H04L 67/147; H04L 67/1089; H04L 67/2885;
(Continued)

(56) References Cited

U.S. PATENT DOCUMENTS 8,954,609 B1 * 2/2015 Holleman ............. H04J 3/0667
709/203
9,295,018 B1 * 3/2016 Ruffini .............. H04W 56/0015
(Continued)

FOREIGN PATENT DOCUMENTS

CN      103138865 A     6/2013
CN      104507156 A     4/2015
(Continued)

OTHER PUBLICATIONS

International Search Report dated Sep. 21, 2016 for PCT/CN2016/070840 (5 pages—Chinese with English translation).

*Primary Examiner* — Warner Wong
(74) *Attorney, Agent, or Firm* — Smith, Gambrell & Russell, LLP

(57) ABSTRACT

The present invention relates to a wireless network communication technology, and in particular to a time synchronization error compensation method for multi-hop wireless backhaul network based on PTP. Based on PTP, the present invention uses an intermediate node to count the timestamps of transceiving the PTP synchronization message Sync and
(Continued)

the delay request message Delay_Req, detect and compensate the local forwarding time of synchronization message Sync and the delay request message Delay_Req and the link delay of transmitting the two between nodes based on the linear regression technology, thereby finally implementing asymmetric delay correction of wireless links between the master and slave nodes and completing time synchronization error compensation. The present invention uses the header of the PTP message to transmit the additional time information about the compensation time, the sending time and arrived time of the message and time correction value without modifying the existing PTP, thereby reducing the message overhead, meeting requirements of real-time and high precision of synchronization error compensation, improving the existing time synchronization precision and having strong practicality.

20 Claims, 2 Drawing Sheets

(52) U.S. Cl.
CPC ...... *H04L 29/08891* (2013.01); *H04L 67/147* (2013.01); *H04W 92/24* (2013.01)

(58) Field of Classification Search
CPC ........... H04L 29/0863; H04L 29/08513; H04L 29/08891; H04L 2027/0095; H04L 41/044
See application file for complete search history.

(56) References Cited

U.S. PATENT DOCUMENTS

| | | | | |
|---|---|---|---|---|
| 2007/0008993 A1* | 1/2007 | Cha | ...................... | H04J 3/0664 370/509 |
| 2009/0013330 A1* | 1/2009 | Gotz | ..................... | H04J 3/0697 719/313 |
| 2011/0075685 A1* | 3/2011 | Xu | ..................... | H04L 27/2663 370/503 |
| 2011/0262133 A1* | 10/2011 | Yuan | ..................... | H04J 3/0667 398/43 |
| 2013/0077509 A1* | 3/2013 | Hirota | .................... | H04L 47/56 370/252 |
| 2013/0100835 A1* | 4/2013 | Teng | ........................ | H04L 5/001 370/252 |
| 2013/0139251 A1* | 5/2013 | Amemura | ............. | G06F 21/123 726/20 |
| 2013/0163618 A1* | 6/2013 | Sergeev | ................. | H04J 3/0658 370/503 |
| 2013/0170507 A1* | 7/2013 | Hsueh | ................. | H04L 63/0428 370/503 |
| 2014/0064303 A1* | 3/2014 | Aweya | .................. | H04J 3/0667 370/509 |
| 2014/0146811 A1* | 5/2014 | Wen | ........................ | H04J 3/0667 370/350 |
| 2014/0177653 A1* | 6/2014 | Tzeng | .................... | H04J 3/0635 370/503 |
| 2014/0269672 A1* | 9/2014 | Zampetti | ........... | H04W 56/0015 370/350 |
| 2014/0362868 A1* | 12/2014 | Hirota | ................... | H04J 3/0673 370/412 |
| 2015/0092793 A1* | 4/2015 | Aweya | .................. | H04J 3/0685 370/503 |
| 2015/0092796 A1* | 4/2015 | Aweya | .................. | H04J 3/0667 370/516 |
| 2015/0163154 A1* | 6/2015 | Chaloupka | ............ | H04L 47/283 370/503 |
| 2015/0171980 A1* | 6/2015 | Bui | ........................ | H04L 43/10 370/393 |
| 2016/0170440 A1* | 6/2016 | Aweya | ..................... | G06F 1/12 713/503 |

FOREIGN PATENT DOCUMENTS

| | | |
|---|---|---|
| CN | 104754722 A | 7/2015 |
| EP | 2034629 A1 | 3/2009 |

* cited by examiner

TIME SYNCHRONIZATION ERROR COMPENSATION METHOD FOR MULTI-HOP WIRELESS BACKHAUL NETWORK BASED ON PTP

TECHNICAL FIELD

The present invention relates to the field of wireless network communications, and in particular to a time synchronization error compensation method for multi-hop wireless backhaul network based on PTP.

BACKGROUND

Multi-hop wireless backhaul networks (MWBNs) aim to provide high-speed, long-distance, non-line of sight and low-cost wireless access services, which have made up for the deficiencies of difficult wiring, high costs, limited network coverage area, poor topology flexibility and other problems existing in wired backhaul networks. Because of adverse factory environment and difficult wiring, and to improve the factory production efficiency, there is an urgent need for novel industrial applications, such as digital oilfield, wide area interconnection of smart grids, cooperation of industrial robots and the like, to construct backhaul networks based on management-control integration, so as to complete regional coverage, and achieve hybrid transmission of measurement, control, audio, video and other information. For new requirements of industrial applications, MWBNs have obvious advantages.

However, control information about a device often has strict requirements for the QoS of MWBNs, for example, the reliability of control signals is required to be 100%, and the time delay and jitter are required to be ms level, i.e., MWBNs need to meet the requirements of high real-time, high reliability and the like for control information transmission. As a key technology of MWBNs, the time synchronization technology plays a crucial role in solving the problems of information fusion and coprocessing, and guarantee of real-time, reliability and the like of information transmission. However, the local time of nodes is obtained by counting the output pulses of internal crystal oscillators, and synchronization between nodes is achieved by exchanging time information. Therefore, it is difficult for nodes to achieve precise synchronization in the aspect of time under the influence of difference between internal crystal oscillators and the interference of network communication links under the factory environment.

Based on the existing network communication protocol, the IEEE 1588v2 Precision Time Protocol (PTP) solves the problem of time synchronization in the industrial wired Ethernet, and the current synchronization precision can reach 50 ns. However, the key for PTP to achieve high-precision time synchronization is based on a hardware timestamp and symmetrical links. The so-called hardware timestamp refers to a transceiving timestamp for acquiring network messages near the physical layer. Meanwhile, to further counteract the influence of link asymmetry, PTP establishes a concept of peer-to-peer transparent clocks, thereby effectively guaranteeing the symmetry between uplink and downlink, and then improving the time synchronization precision. However, most Wi-Fi chips at present are of a single-chip structure, i.e., the selection of a Wi-Fi node timestamp is only achieved above the MAC layer, and then the asymmetry of links is seriously affected by the forwarding delay differences of MAC layer queuing, PHY layer transmission and others, and the selection mechanism of timestamps. In most existing methods, a statistical principle is used to perform link delay compensation, where messages in the network are added, and the real-time is poor at the same time. Moreover, it is found by experiment that the synchronization precision of directly applying the PTP to a wireless network can reach ms level. Meanwhile, open source Wi-Fi chips are unavailable in the market, and development costs caused by designing MAC layers of Wi-Fi based on an FPGA are too high, so that it is undesirable to design PTP-based wireless network nodes.

SUMMARY

For the above-mentioned defects existing in the prior art, the technical problem to be solved by the present invention is to provide a time synchronization error compensation method for multi-hop wireless backhaul network based on PTP, where it can implement delay compensation of wireless communication links of a PTP device based on the current PTP Ethernet device, and then implement high-precision time synchronization.

To realize the above-mentioned purposes, the present invention discloses the technical solution: a time synchronization error compensation method for multi-hop wireless backhaul network based on PTP comprises the following steps:

Constructing nodes at an industrial site into a hierarchical multi-hop network structure;

take a root node as a master node and a leaf node as a slave node. The master node and the slave node utilize the two-step synchronization manner of PTP to perform time synchronization;

when an intermediate node i for forwarding data between the master node and the slave node forwards messages, it records the relevant time information about a PTP message, and computes the additional time information based the linear regression technology;

when the intermediate node i sends a follow-up message Follow_Up, a delay request response message Delay_Resp and a synchronization message Sync, it carries the additional time information using a modified header; and the slave node completes synchronization error compensation according to the PTP when it receives the PTP message.

The two-step synchronization manner refers to transmitting time information about the synchronization message Sync using the follow-up message Follow_Up and transmitting time information about a delay request message Delay_Req using the delay request response message Delay_Resp.

The time information about the PTP messages includes: an arrived time $Ts\_arrived_i$ and an arrived time $Td\_arrived_i$ when the synchronization message Sync and the delay request message Delay_Req arrive at the intermediate node i, a left time $Ts\_left_i$ and a left time $Td\_left_i$ when the synchronization message Sync and the delay request message Delay_Req leave the intermediate node i, and a message ID; a time $Ts\_left_{i-1}$ when the synchronization message Sync leaves a node i-1 acquired from the follow-up message Follow_Up which is consistent with the synchronization message Sync in ID; a time $Td\_arrived_{i-1}$ when the delay request message Delay_Req arrives at the node i-1 acquired from the delay request response message Delay_Resp which is consistent with the delay request message Delay_Req in ID; and a time correction value $\beta_{i-1}$ of the node i-1 acquired from the synchronization message Sync.

The additional time information includes: a local time correction value $\beta_i$, a local forwarding time and a link delay of transmitting the synchronization message Sync and the delay request message Delay_Req between the node i and node i-1.

The step of computing the additional time information based on the linear regression technology specifically includes:

the intermediate node i stores the latest N groups of time information (Ts_arrived$_i$, Ts_arrived$_i$-Ts_left$_{i-1}$), wherein (Ts_arrived$_{i,k}$, Ts_arrived$_{i,k}$-Ts_left$_{i-1,k}$) are information of the $k^{th}$ group. Based on the linear regression technology—the least square method, the intermediate node i obtains the slope of the time offset between the node i and the node i-1 relative to the arrived time Ts_arrived$_i$:

$$\alpha_{i-1,i} = \frac{\sum_{k=1}^{N}(\widetilde{offse}t_{i-1,i_k} - \overline{\widetilde{offse}t_{i-1,i}})(\text{Ts\_arrived}_{i,k} - \overline{\text{Ts\_arrived}_i})}{\sum_{i=1}^{N}(\text{Ts\_arrived}_{i,k} - \overline{\text{Ts\_arrived}_i})^2} \quad (3)$$

wherein $$\widetilde{offse}t_{i-1,i_k} = \text{Ts\_arrived}_{i,k} - \text{Ts\_left}_{i-1,k},$$

$$\overline{\widetilde{offse}t_{i-1,i}} = \frac{1}{N}\sum_k^N \widetilde{offse}t_{i-1,i_k}, \overline{\text{Ts\_arrived}_i} = \frac{1}{N}\sum_k^N \text{Ts\_arrived}_{i,k},$$

then the time correction value of the node i is:

$$\beta_i = (1-\alpha_{i-1,i})\beta_{i-1} \quad (4)$$

the time offset between the node i and the node i-1 is:

$$\text{offset}_{i-1,i_k} = \alpha_{i-1,i} \cdot (\widetilde{Ts}\_\text{arrived}_{i,k} - \overline{\widetilde{Ts}\_\text{arrived}_i}) + \overline{\text{offset}_{i-1,i}} \quad (5)$$

the local forwarding time of the synchronization message Sync and the delay request message Delay_Req is:

$$T\_\text{dwell}_i = (T\_\text{left}_i - T\_\text{arrived}_i)\beta_i \quad (6)$$

wherein for the delay request message Delay_Req, T_arrived$_i$ is Td_arrived$_i$, and T_left$_i$ is Td_left$_i$; and for the synchronization message Sync, T_arrived$_i$ is Ts_arrived$_i$, and T_left$_i$ is Ts_left$_i$.

The link delay of transmitting the synchronization message Sync between the node i and the node i-1 is:

$$\text{linkDelay}_{i-1,i} = (\widetilde{Ts}\_\text{arrived}_i - \widetilde{Ts}\_\text{left}_{i-1} - \text{offset}_{i-1,i})\beta_i \quad (7)$$

The link delay of transmitting the delay request message Delay_Req between the node i and the node i-1 is:

$$\text{linkDelay}_{i,i-1} = (Td\_\text{arrived}_{i-1} - Td\_\text{left}_i + \text{offset}_{i-1,i})\beta_i \quad (8)$$

The modified header is the PTP general header format of using a reserved field of the header (4 bytes) to transmit the added time information.

The step of carrying the additional time information specifically includes:

when sending the follow-up message Follow_Up and the delay request response message Delay_Resp, the intermediate node i respectively adds the forwarding time of the synchronization message Sync and the delay request message Delay_Req which are consistent with the two in ID and the link delay into respective header correction fields correction Field; and respectively writes the left time Ts_left$_i$ of the synchronization message Sync and the arrived time Td_arrived$_{s,i}$ of the delay request message Delay_Req which are consistent with the two in ID into respective reserved fields of the header (4 bytes); and when sending the synchronization message Sync, the intermediate node i writes the local time correction value into the reserved field of the header (4 bytes).

The header correction field is that: in two-step synchronization, the field values of the synchronization message Sync and the delay request message Delay_Req are 0, and the field values of the follow-up message Follow_Up and the delay request response message Delay_Resp are the forwarding delay and the link delay of the synchronization message Sync and the delay request message Delay_Req in the intermediate node respectively.

The step of completing synchronization error compensation according to the PTP when the slave node receives the PTP message specifically includes:

the slave node computes a mean path delay meanPathDelay and a time offset shift according to the sending time and receiving time of the synchronization message Sync and the delay request message Delay_Req, and the correctionField values of the follow-up message Follow_Up and the delay request response message Delay_Resp which are consistent with the two in ID;

$$\text{meanPathDelay} = [(t2-t3)+(t4-t1)-\text{correctionField of Follow\_Up}-\text{correctionField of Delay\_Resp}]/2 \quad (9)$$

$$\text{shift} = t2-t1-\text{meanPathDelay}-\text{correctionFieldofFollow\_Up} \quad (10),$$

and then completes time synchronization error compensation, wherein t1 is the time of sending the synchronization message Sync recorded by the master clock, t2 is the time of receiving the synchronization message Sync recorded by the slave clock, t3 is the time of sending the delay request message Delay_Req recorded by the slave clock, and t4 is the time of receiving the delay request message Delay_Req recorded by the master clock.

In the time synchronization error compensation method for multi-hop wireless backhaul network based on PTP proposed by the present invention, the limitation of the existing device and the asymmetry problem of wireless links are fully taken into account, and on the basis that the existing PTP is not affected, the message overhead is reduced, the real-time correction of the link delay is implemented, and the time synchronization error compensation is completed, which are specifically manifested in the following aspects:

1. The present invention reduces development costs based on the existing PTP and device;

2. The present invention reduces the message overhead by using the correction field (correctionField) and the reserved field (reserved) of the PTP message header to transmit the additional time information;

3. The present invention implements PTP message forwarding time and link delay compensation using the intermediate node, thereby meeting the requirements of real-time of link delay correction and high precision of synchronization error compensation, improving the existing time synchronization precision and having strong practicality.

DETAILED DESCRIPTION

The present invention will be further described in detail below in combination with the drawings and the embodiments.

The method of the present invention comprises the following steps: constructing nodes at an industrial site into a hierarchical multi-hop network structure; using the two-step synchronization manner under PTP; and completing forwarding time and link delay detection and compensation of the PTP synchronization message Sync and delay request message Delay_Req using an intermediate node, to implement time synchronization error compensation.

Figure 1:
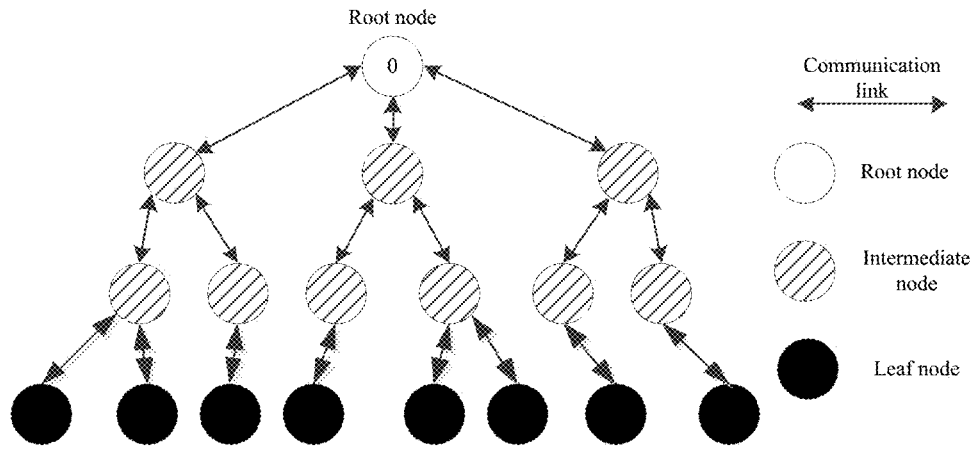
FIG. 1 is a schematic diagram showing an industrial wireless network of the present invention.

FIG. 1 shows the hierarchical multi-hop network structure constructed in the present invention. The root node in the network is taken as the time source, i.e., the master node; and the leaf node is taken as the slave node. It communicates with the master node in a multi-hop manner, and is taken as an access node which is responsible for information fusion of access networks. However, as a forwarding node, the intermediate node implements the forwarding of uplink and downlink data packets and completes message forwarding delay and link delay compensation.

Figure 2:
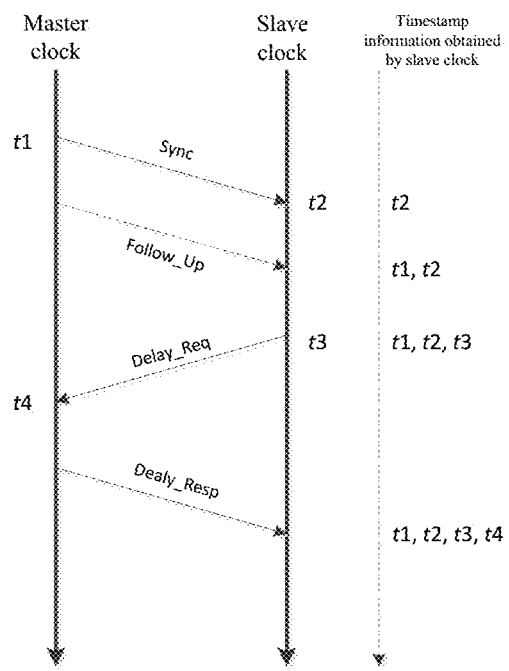
FIG. 2 is a diagram showing a two-step synchronization principle under PTP.

FIG. 2 shows a two-step synchronization principle under PTP. The master clock periodically sends synchronization message Sync containing the sending time t1; the slave clock records the time t2 when the synchronization message is received, then sends delay request message Delay_Req, and records the sending time t3; and the master clock records the time t4 when the delay request message Delay_Req is received and sends delay request response message Delay_Resp containing t4 to the slave clock. The slave clock computes the mean path delay meanPathDelay and the time offset shift between itself and the master clock according to the four obtained time values t1, t2, t3 and t4:

$$\text{meanPathDelay}=[(t2-t1)+(t4-t3)]/2 \tag{1}$$

$$\text{shift}=[(t2-t1)-(t4-t3)]/2 \tag{2}$$

Obviously, the computation of meanPathDelay is based on uplink and downlink symmetry, i.e., only the condition of uplink and downlink symmetry is satisfied, the link delay obtained by formula (1) is a precise link delay. However, in an actual network environment, especially in a multi-hop wireless network environment, the condition is not satisfied, i.e., a relatively large error exists in the link delay and time shift between the mater node and slave node obtained according to (1) and (2), thereby causing serious decrease of time synchronization precision. Therefore, there is a need to perform real-time compensation on the time synchronization error.

The time of the network nodes are obtained by counting the output pulses of local crystal oscillators. However, the frequency of crystal oscillators of node clocks is stable within a certain time range. Meanwhile, the node time T has a linear relationship with the absolute time t, i.e., $T=\alpha \cdot t+\beta$. Therefore, the time shift between nodes also has a linear relationship with time.

Figures 3, 4:
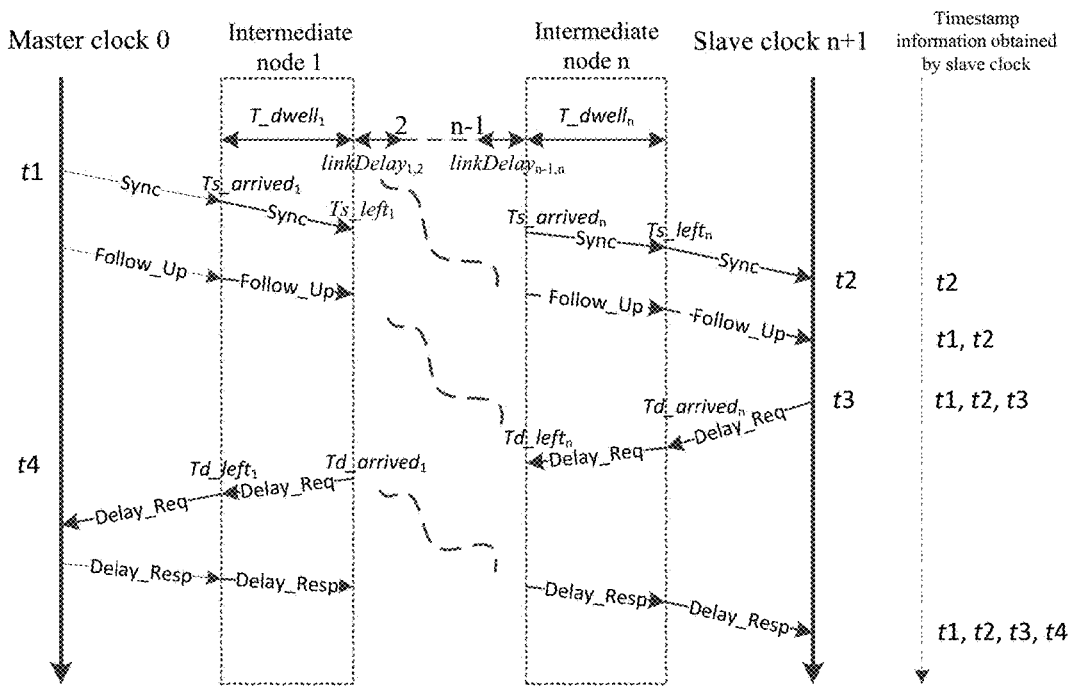
FIG. 3 is a schematic diagram showing link delay compensation completed by an intermediate node under PTP.
FIG. 4 is a diagram showing the modified PTP message header used by the present invention.

The time synchronization error compensation method for multi-hop wireless backhaul network based on PTP is implemented through the following described methods, as shown in FIG. 3.

(1) An intermediate node i records an arrived time $Ts\_arrived_i$ and an arrived time $Td\_arrived_i$ when the synchronization message Sync and the delay request message Delay_Req arrive, and a left time $Ts\_left_i$ and a left time $Td\_left_i$ when the synchronization message Sync and the delay request message Delay_Req leave, and the message ID;

(2) According to the sending time of the synchronization message Sync at the node i-1 and the local arrived time $Ts\_arrived_i$, the intermediate node i stores the latest N groups of time information ($Ts\_arrived_i$, $Ts\_arrived_i-Ts\_left_{i-1}$), wherein ($Ts\_arrived_{i,k}$, $Ts\_arrived_{i,k}-Ts\_left_{i-1,k}$) are information of the $k^{th}$ group, and obtains the slope of the time offset between the node i and the node i-1 relative to the arrived time $Ts\_arrived_i$ based on the linear regression technology, namely, the least square method;

$$\alpha_{i-1,i} = \frac{\sum_{k=1}^{N}(\overline{offse}\,t_{i-1,i_k} - \overline{\overline{offse}\,t_{i-1,l}})(Ts\_arrived_{i,k} - \overline{Ts\_arrived_i})}{\sum_{i=1}^{N}(Ts\_arrived_{i,k} - \overline{Ts\_arrived_i})^2} \tag{3}$$

wherein $$\overline{offse}\,t_{i-1,i_k} = Ts\_arrived_{i,k} - Ts\_left_{i-1,k},$$

$$\overline{\overline{offse}\,t_{i-1,l}} = \frac{1}{N}\sum_{k}^{N}\overline{offse}\,t_{i-1,i_k}, \overline{Ts\_arrived_i} = \frac{1}{N}\sum_{k}^{N}Ts\_arrived_{i,k},$$

then the time correction value of the node i is:

$$\beta_i = (1-\alpha_{i-1,i})\beta_{i-1} \tag{4}$$

The time offset between the node i and the node i-1 is:

$$\text{offset}_{i-1,i_k} = \alpha_{i-1,i} \cdot (Ts\_arrived_{i,k} - \overline{Ts\_arrived_i}) + \overline{\overline{\text{offset}_{t-1,t}}} \tag{5}$$

The local forwarding time of the synchronization message Sync and the delay request message Delay_Req is:

$$T\_dwell_i = (T\_left_i - T\_arrived_i)\beta_i \tag{6}$$

wherein for the delay request message Delay_Req, $T\_arrived_i$ is $Ts\_arrived_i$, and $T\_left_i$ is $Ts\_left_i$; and for the synchronization message Sync, $T\_arrived_i$ is $Ts\_arrived_i$, and $T\_left_i$ is $Ts\_left_i$.

The link delay of transmitting the synchronization message Sync between the node i and the node i-1 is:

$$\text{linkDelay}_{i-1,i} = (Ts\_arrived_i - Ts\_left_{i-1} - \text{offset}_{i-1,i})\beta_i \tag{7}$$

The link delay of transmitting the delay request message Delay_Req between the node i and the node i-1 is:

$$\text{linkDelay}_{i,i-1} = (Td\_arrived_{i-1} - Td\_left_i + \text{offset}_{i-1,i})\beta_i \tag{8}$$

(3) when receiving the follow-up message Follow_Up and the delay request response message Delay_Resp, the intermediate node i respectively adds the forwarding time and the link delay of the messages which are consistent with the two in ID into the header correction fields correctionField of the follow-up message Follow_Up and the delay request response message Delay_Resp; and when sending the follow-up message Follow_Up, the delay request response message Delay_Resp and the synchronization message Sync, the intermediate node i uses modified headers to respectively carry the sending time $Ts\_left_i$ of the synchronization message Sync and the arrived time $Td\_arrived_i$ of the delay request message Delay_Req which are consistent with the messages in ID, and the time correction value $\beta_i$; and (4) according to the sending time and the receiving time of the synchronization message Sync and the delay request message Delay_Req, and correctionField values of the follow-up message Follow_Up and the delay request response message Delay_Resp which are consistent with the two in ID, the slave computes the mean path delay meanPathDelay and the time offset shift:

meanPathDelay=[($t2-t3$)+($t4-t1$)correctionField of Follow_Up−correctionField of Delay_Resp]/2 (9)

shift=$t2-t1$−meanPathDelay−correctionField of Follow_Up (10), and then completes time synchronization error compensation.

As shown in FIG. 4, the message correction field refers to the header correctionField of the PTP message. In the two-step clock, the field values of the synchronization message Sync and the delay request message Delay_Req are 0, and the field values of the follow-up message Follow_Up and the delay request response message Delay_Resp are the forwarding delay and link delay of the synchronization message Sync and the delay request message Delay_Req in the intermediate node. The added time information is transmitted using the modified headers, that is, the added time information about the sending time Ts_left$_i$ of the synchronization message Sync and the arrived time Td_arrived$_i$ of the delay request message Delay_Req which are consistent with the messages in ID, and the time correction value $\beta_i$ is transferred using the follow-up message Follow_Up, the delay request response message Delay_Resp and the reserved field of the header of the synchronization message Sync (4 bytes). Meanwhile, the message types are detected by checking the messageType field, and the messageType field values of Sync, Delay_Req, Follow_Up and Delay_Resp messages being 0, 1, 8 and 9 respectively.

We claim:

1. A time synchronization error compensation method for multi-hop wireless backhaul network based on Precision Time Protocol (PTP), comprising:
   constructing nodes at an industrial site into a hierarchical multi-hop network structure; and
   performing time synchronization utilizing a two-step synchronization manner of PTP with a root node as a master node and a leaf node as a slave node, wherein
   when an intermediate node i for forwarding data between the master node and the slave node forwards messages, the intermediate node i records relevant time information about a PTP message, and computes additional time information based on linear regression technology,
   when the intermediate node i sends a follow-up message Follow_Up, a delay request response message Delay_Resp and a synchronization message Sync, the intermediate node i carries the additional time information using a modified header,
   when the slave node receives the PTP message, the slave node completes synchronization error compensation according to the PTP, and
   the relevant time information about the PTP messages comprises:
      an arrived time Ts_arrived$_i$ and an arrived time Td_arrived$_i$ when the synchronization message Sync and a delay request message Delay_Req arrive at the intermediate node i, a left time Ts_left$_i$ and a left time Td_left$_i$ when the synchronization message Sync and the delay request message Delay_Req leave the intermediate node i, and a message ID;
      a time Ts_left$_{i-1}$ when the synchronization message Sync leaves a node i-1 acquired from the follow-up message Follow_Up which is consistent with the synchronization message Sync in message ID;
      a time Td_arrived$_{i-1}$ when the delay request message Delay_Req arrives at the node i-1 acquired from the delay request response message Delay_Resp which is consistent with the delay request message Delay_Req in message ID; and
      a time correction value $\beta_{i-1}$ of the node i-1 acquired from the synchronization message Sync.

2. The time synchronization error compensation method for multi-hop wireless backhaul network based on PTP of claim 1, wherein
   the two-step synchronization manner comprises transmitting time information about the synchronization message Sync using the follow-up message Follow_Up and transmitting time information about the delay request message Delay_Req using the delay request response message Delay_Resp.

3. The time synchronization error compensation method for multi-hop wireless backhaul network based on PTP of claim 1, wherein
   the additional time information comprises: a local time correction value $\beta_i$, a local forwarding time, and a link delay of transmitting the synchronization message Sync and the delay request message Delay_Req between the node i and node i-1.

4. The time synchronization error compensation method for multi-hop wireless backhaul network based on PTP of claim 1, wherein
   the modified header is in a PTP general header format using a reserved field of the modified header to transmit the additional time information.

5. The time synchronization error compensation method for multi-hop wireless backhaul network based on PTP of claim 1, wherein
   the step of completing synchronization error compensation according to the PTP when the slave node receives the PTP message comprises:
      the slave node computes a mean path delay meanPathDelay and a time offset shift according to a sending time and a receiving time of the synchronization message Sync and the delay request message Delay_Req and correctionField values of the follow-up message Follow_Up and the delay request response message Delay_Resp which are consistent with the two in message ID according to the equations;

meanPathDelay=[($t2-t3$)+($t4-t1$)−correctionField of Follow_Up−correctionField of Delay_Resp]/2 shift=$t2-t1$−meanPathDelay−correctionField of Follow_Up, and then completes time synchronization error compensation,
      wherein t1 is a time of sending the synchronization message Sync recorded by a master clock, t2 is a time of receiving the synchronization message Sync recorded by a slave clock, t3 is a time of sending the delay request message Delay_Req recorded by the slave clock, and t4 is a time of receiving the delay request message Delay_Req recorded by the master clock.

6. A time synchronization error compensation method for multi-hop wireless backhaul network based on Precision Time Protocol (PTP), comprising:
constructing nodes at an industrial site into a hierarchical multi-hop network structure; and
performing time synchronization utilizing a two-step synchronization manner of PTP with a root node as a master node and a leaf node as a slave node, wherein
when an intermediate node i for forwarding data between the master node and the slave node forwards messages, the intermediate node i records relevant time information about a PTP message, and computes additional time information based on linear regression technology,
when the intermediate node i sends a follow-up message Follow_Up, a delay request response message Delay_Resp and a synchronization message Sync, the intermediate node i carries the additional time information using a modified header,
when the slave node receives the PTP message, the slave node completes synchronization error compensation according to the PTP, and
the step of computing the additional time information based the linear regression technology comprises:
the intermediate node i stores the latest N groups of time information (Ts_arrived$_i$, Ts_arrived$_i$-Ts_left$_{i-1}$), wherein (Ts_arrived$_{i,k}$, Ts_arrived$_{i,k}$-Ts_left$_{i-1,k}$) are information of the $k^{th}$ group;
based on a least square method, the intermediate node i obtains a slope of a time offset between the node i and the node i-1 relative to an arrived time Ts_arrived$_i$ based on the equation:

$$\alpha_{i-1,i} = \frac{\sum_{k=1}^{N}(\overline{offset}_{i-1,i_k} - \overline{\overline{offset}_{i-1,i}})(\text{Ts\_arrived}_{i,k} - \overline{\text{Ts\_arrived}_i})}{\sum_{i=1}^{N}(\text{Ts\_arrived}_{i,k} - \overline{\text{Ts\_arrived}_i})^2}$$

wherein $\overline{offset}_{i-1,i_k} = \text{Ts\_arrived}_{i,k} - \text{Ts\_left}_{i-1,k}$, $\overline{\overline{offset}_{i-1,i}} = \frac{1}{N}\sum_k^N \overline{offset}_{i-1,i_k}$, $\overline{\text{Ts\_arrived}_i} = \frac{1}{N}\sum_k^N \text{Ts\_arrived}_{i,k}$, a time correction value of the node i is: $\beta_i = (1-\alpha_{i-1,i})\beta_{i-1}$, the time offset between the node i and the node i-1 is:

offset$_{i-1,i_k} = \alpha_{i-1,i} \cdot (\text{Ts\_arrived}_{i,k} - \overline{\text{Ts\_arrived}_i}) + \overline{\overline{offset}_{i-1,i}}$ a local forwarding time of the synchronization message Sync and a delay request message Delay_Req is:

$T\_dwell_i = (T\_left_i - T\_arrived_i)\beta_i$ for the delay request message Delay_Req, T_arrived$_i$ is Td_arrived$_i$, and T_left$_i$ is Td_left$_i$, and
for the synchronization message Sync, T_arrived$_i$ is Ts_arrived$_i$, and T_left$_i$ is Ts_left$_i$,
a link delay of transmitting the synchronization message Sync between the node i and the node i-1 is:

linkDelay$_{i-1,i} = (\text{Ts\_arrived}_i - \text{Ts\_left}_{i-1} - \text{offset}_{i-1,i})\beta_i$, and a link delay of transmitting the delay request message Delay_Req between the node i and the node i-1 is:

linkDelay$_{i,i-1} = (Td\_\text{arrived}_{i-1} - Td\_\text{left}_i + \text{offset}_{i-1,i})\beta_i$.

7. The time synchronization error compensation method for multi-hop wireless backhaul network based on PTP of claim 6, wherein
the two-step synchronization manner comprises transmitting time information about the synchronization message Sync using the follow-up message Follow_Up and transmitting time information about the delay request message Delay_Req using the delay request response message Delay_Resp.

8. The time synchronization error compensation method for multi-hop wireless backhaul network based on PTP of claim 6, wherein
the additional time information comprises: the local time correction value $\beta_i$, the local forwarding time, and the link delay of transmitting the synchronization message Sync and the delay request message Delay_Req between the node i and node i-1.

9. The time synchronization error compensation method for multi-hop wireless backhaul network based on PTP of claim 6, wherein
the modified header is in a PTP general header format using a reserved field of the modified header to transmit the additional time information.

10. The time synchronization error compensation method for multi-hop wireless backhaul network based on PTP of claim 6, wherein
the relevant time information about the PTP messages comprises:
the arrived time Ts_arrived$_i$ and the arrived time Td_arrived$_i$ when the synchronization message Sync and the delay request message Delay_Req arrive at the intermediate node i, the left time Ts_left$_i$ and the left time Td_left$_i$ when the synchronization message Sync and the delay request message Delay_Req leave the intermediate node i, and a message ID;
the time Ts_left$_{i-1}$ when the synchronization message Sync leaves a node i-1 acquired from the follow-up message Follow_Up which is consistent with the synchronization message Sync in message ID;
the time Td_arrived$_{i-1}$ when the delay request message Delay_Req arrives at the node i-1 acquired from the delay request response message Delay_Resp which is consistent with the delay request message Delay_Req in message ID; and
a time correction value $\beta_{i-1}$ of the node i-1 acquired from the synchronization message Sync.

11. A time synchronization error compensation method for multi-hop wireless backhaul network based on Precision Time Protocol (PTP), comprising:
constructing nodes at an industrial site into a hierarchical multi-hop network structure; and
performing time synchronization utilizing a two-step synchronization manner of PTP with a root node as a master node and a leaf node as a slave node, wherein
when an intermediate node i for forwarding data between the master node and the slave node forwards messages, the intermediate node i records relevant time information about a PTP message, and computes additional time information based on linear regression technology,
when the intermediate node i sends a follow-up message Follow_Up, a delay request response message Delay_Resp and a synchronization message Sync, the intermediate node i carries the additional time information using a modified header, when the slave node receives the PTP message, the slave node completes synchronization error compensation according to the PTP, and the step of carrying the additional time information comprises:

when sending the follow-up message Follow_Up and the delay request response message Delay_Resp, the intermediate node i respectively adds a forwarding time of the synchronization message Sync and a delay request message Delay_Req which are consistent with the two in a message ID and a link delay into respective header correction field correctionField of the modified header; and respectively writes a left time $Ts\_left_i$ of the synchronization message Sync and an arrived time $Td\_arrived_i$ of the delay request message Delay_Req which are consistent with the two in the message ID into respective reserved fields of the modified header; and when sending the synchronization message Sync, the intermediate node i writes a local time correction value into a reserved field of the modified header.

12. The time synchronization error compensation method for multi-hop wireless backhaul network based on PTP of claim 11, wherein in the two-step synchronization manner, the field values of the synchronization message Sync and the delay request message Delay_Req are 0, and the field values of the follow-up message Follow_Up and the delay request response message Delay_Resp are a forwarding delay and the link delay of the synchronization message Sync and the delay request message Delay_Req in the intermediate node i respectively.

13. The time synchronization error compensation method for multi-hop wireless backhaul network based on PTP of claim 11, wherein the two-step synchronization manner comprises transmitting time information about the synchronization message Sync using the follow-up message Follow_Up and transmitting time information about the delay request message Delay_Req using the delay request response message Delay_Resp.

14. The time synchronization error compensation method for multi-hop wireless backhaul network based on PTP of claim 11, wherein the additional time information comprises: the local time correction value $\beta_i$, a local forwarding time, and a link delay of transmitting the synchronization message Sync and the delay request message Delay_Req between the node i and node i-1.

15. The time synchronization error compensation method for multi-hop wireless backhaul network based on PTP of claim 11, wherein the modified header is in a PTP general header format using a reserved field of the modified header to transmit the additional time information.

16. The time synchronization error compensation method for multi-hop wireless backhaul network based on PTP of claim 11, wherein the step of completing synchronization error compensation according to the PTP when the slave node receives the PTP message comprises:

the slave node computes a mean path delay meanPathDelay and a time offset shift according to a sending time and a receiving time of the synchronization message Sync and the delay request message Delay_Req and correctionField values of the follow-up message Follow_Up and the delay request response message Delay_Resp which are consistent with the two in message ID according to the equations;

meanPathDelay=[($t2$−$t3$)+($t4$−$t1$)−correctionField of Follow_Up−correctionField of Delay_Resp]/2 shift=$t2$−$t1$−meanPathDelay−correctionField of Follow_Up, and then completes time synchronization error compensation, wherein t1 is a time of sending the synchronization message Sync recorded by a master clock, t2 is a time of receiving the synchronization message Sync recorded by a slave clock, t3 is a time of sending the delay request message Delay_Req recorded by the slave clock, and 14 is a time of receiving the delay request message Delay_Req recorded by the master clock.

17. A time synchronization error compensation method for multi-hop wireless backhaul network based on Precision Time Protocol (PTP), comprising:

constructing nodes at an industrial site into a hierarchical multi-hop network structure; and performing time synchronization utilizing a two-step synchronization manner of PTP with a root node as a master node and a leaf node as a slave node, wherein when an intermediate node i for forwarding data between the master node and the slave node forwards messages, the intermediate node i records relevant time information about a PTP message, and computes additional time information based on linear regression technology, when the intermediate node i sends a follow-up message Follow_Up, a delay request response message Delay_Resp and a synchronization message Sync, the intermediate node i carries the additional time information using a modified header, when the slave node receives the PTP message, the slave node completes synchronization error compensation according to the PTP, and the step of completing synchronization error compensation according to the PTP when the slave node receives the PTP message comprises:

the slave node computes a mean path delay meanPathDelay and a time offset shift according to a sending time and a receiving time of the synchronization message Sync and a delay request message Delay_Req and correctionField values of the follow-up message Follow_Up and the delay request response message Delay_Resp which are consistent with the two in message ID according to the equations;

meanPathDelay=[($t2$−$t3$)+($t4$−$t1$)−correctionField of Follow_Up−correctionField of Delay_Resp]/2 shift=$t2$−$t1$−meanPathDelay−correctionField of Follow_Up, and then completes time synchronization error compensation, wherein t1 is a time of sending the synchronization message Sync recorded by a master clock, t2 is a time of receiving the synchronization message Sync recorded by a slave clock, t3 is a time of sending the delay request message Delay_Req recorded by the slave clock, and t4 is a time of receiving the delay request message Delay_Req recorded by the master clock.

18. The time synchronization error compensation method for multi-hop wireless backhaul network based on PTP of claim 17, wherein the two-step synchronization manner comprises transmitting time information about the synchronization message Sync using the follow-up message Follow_Up and transmitting time information about the delay request message Delay_Req using the delay request response message Delay_Resp.

19. The time synchronization error compensation method for multi-hop wireless backhaul network based on PTP of claim 17; wherein the additional time information comprises: a local time correction value $\beta_i$, a local forwarding time, and a link delay of transmitting the synchronization message Sync and the delay request message Delay_Req between the node i and node i-1.

20. The time synchronization error compensation method for multi-hop wireless backhaul network based on PTP of claim 17, wherein the modified header is in a PTP general header format using a reserved field of the modified header to transmit the additional time information.

* * * * *